US008132501B2

(12) United States Patent
Chen et al.

(10) Patent No.: US 8,132,501 B2
(45) Date of Patent: Mar. 13, 2012

(54) COMPLEX HIGH-DENSITY SOYBEAN GRINDER

(75) Inventors: Cheng-Feng Chen, Taipei (TW); Jui-Tai Cheng, Taipei (TW)

(73) Assignee: Jui-Tai Cheng, Taichung (TW)

( * ) Notice: Subject to any disclaimer, the term of this patent is extended or adjusted under 35 U.S.C. 154(b) by 364 days.

(21) Appl. No.: 12/571,442

(22) Filed: Oct. 1, 2009

(65) Prior Publication Data

US 2011/0079154 A1    Apr. 7, 2011

(51) Int. Cl.
*A47J 31/00* (2006.01)
*A23L 1/20* (2006.01)
*B02C 19/20* (2006.01)

(52) U.S. Cl. ............... 99/536; 99/275; 99/485; 99/513; 99/516; 426/489; 426/495; 426/518; 241/46.02; 241/46.06; 210/173; 210/251; 210/511

(58) Field of Classification Search .............. 99/275, 99/279, 287, 485, 513, 516, 536; 426/495, 426/489, 518; 241/46.02, 46.01; 210/173, 210/174, 251, 511

See application file for complete search history.

(56) References Cited

U.S. PATENT DOCUMENTS

| 4,744,524 | A | * | 5/1988 | Gupta et al. ................ 241/36 |
| 4,791,001 | A | * | 12/1988 | Matsuura et al. ............ 426/634 |
| 5,151,285 | A | * | 9/1992 | Williams et al. ............. 426/241 |
| 7,794,772 | B2 | * | 9/2010 | Goto et al. ................... 426/594 |
| 2004/0156975 | A1 | * | 8/2004 | Odelberg-Johnson et al. ................... 426/634 |
| 2010/0323075 | A1 | * | 12/2010 | Takai et al. .................. 426/495 |

* cited by examiner

*Primary Examiner* — Reginald L Alexander
(74) *Attorney, Agent, or Firm* — Leong C. Lei

(57) ABSTRACT

A complex high-density soybean grinder comprises a first filter unit and a second filter unit; a suction unit having a feeding tube for supplying soybeans; a lateral side of the suction unit being installed with a blower and a sound canceller so that soybean can enter into the suction unit; a feeding unit connected to the suction unit and the first filter unit; an electric controller serving to control the feeding unit; a regeneration barrel set connected to the first filter unit and the second filter unit for mixing and agitating soybean dregs from the first filter unit with water; and then the mixed dregs and water being fed into the second filter unit; a reuse barrel set connected to the first filter unit for feeding liquid from the second filter unit to the regeneration barrel set and then to the first filter unit through a pump.

9 Claims, 8 Drawing Sheets

COMPLEX HIGH-DENSITY SOYBEAN GRINDER

FIELD OF THE INVENTION

The present invention relates to a complex high-density soybean grinder, wherein the soybean grinder has a suction unit and a feeding unit. Two filter units are used. The soybean dregs can be reused. The firstly used filtered liquid is reused and enters into the first filter to mix with other soybeans and then is filtered. The process is performed automatically so as to have high-density filtered soybean liquid.

BACKGROUND OF THE INVENTION

The prior art soybean serves to make soybean milk. Only one filtering operation is performed and then the soybean is ground and then the soybean dregs are deserted. However the dregs still have 30% nutrition. Thus to desert the soybean dregs will make the cost for making milk being too high. If the dregs are reused manually, it will cause that the soybean milk is to light to be acceptable by users. Furthermore, more labor is needed. Thus the prior art is not economic.

To achieve above object, the present invention provides a complex high-density soybean grinder which reuse soybean dregs automatically, while the density of the soybean is still high.

SUMMARY OF THE INVENTION

The object of the present invention is to provides a complex high-density soybean grinder comprising a first filter unit and a second filter unit; a suction unit having a feeding tube for supplying soybeans; a lateral side of the suction unit being installed with a blower and a sound canceller so that soybean can enter into the suction unit; a feeding unit connected to the suction unit and the first filter unit; an electric controller serving to control the feeding unit; a regeneration barrel set connected to the first filter unit and the second filter unit for mixing and agitating soybean dregs from the first filter unit with water; and then the mixed dregs and water being fed into the second filter unit; a reuse barrel set connected to the first filter unit for feeding liquid from the second filter unit to the regeneration barrel set and then to the first filter unit through a pump.

Furthermore, each of the first filter unit and the second filter unit comprising; a seat having a motor therein and a draining outlet; a cover installed on the seat and having a feeding inlet and a dreg outlet; an upper filter net for draining filtered liquid; a lower filter net; the upper filter net overlapping upon the lower filter net; soybean dregs being driven to the dreg outlet by the extruding sheet at the top end of the lower filter net by using eccentric force; an upper grinding wheel installed to the feeding inlet; a spindle of the upper grinding wheel having an axial hole; the upper grinding wheel being installed to a bottom of the feeding inlet and locked to the cover; and a lower grinding wheel located to a spindle of a motor and having functions of grinding soybean and removing dregs.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 4:
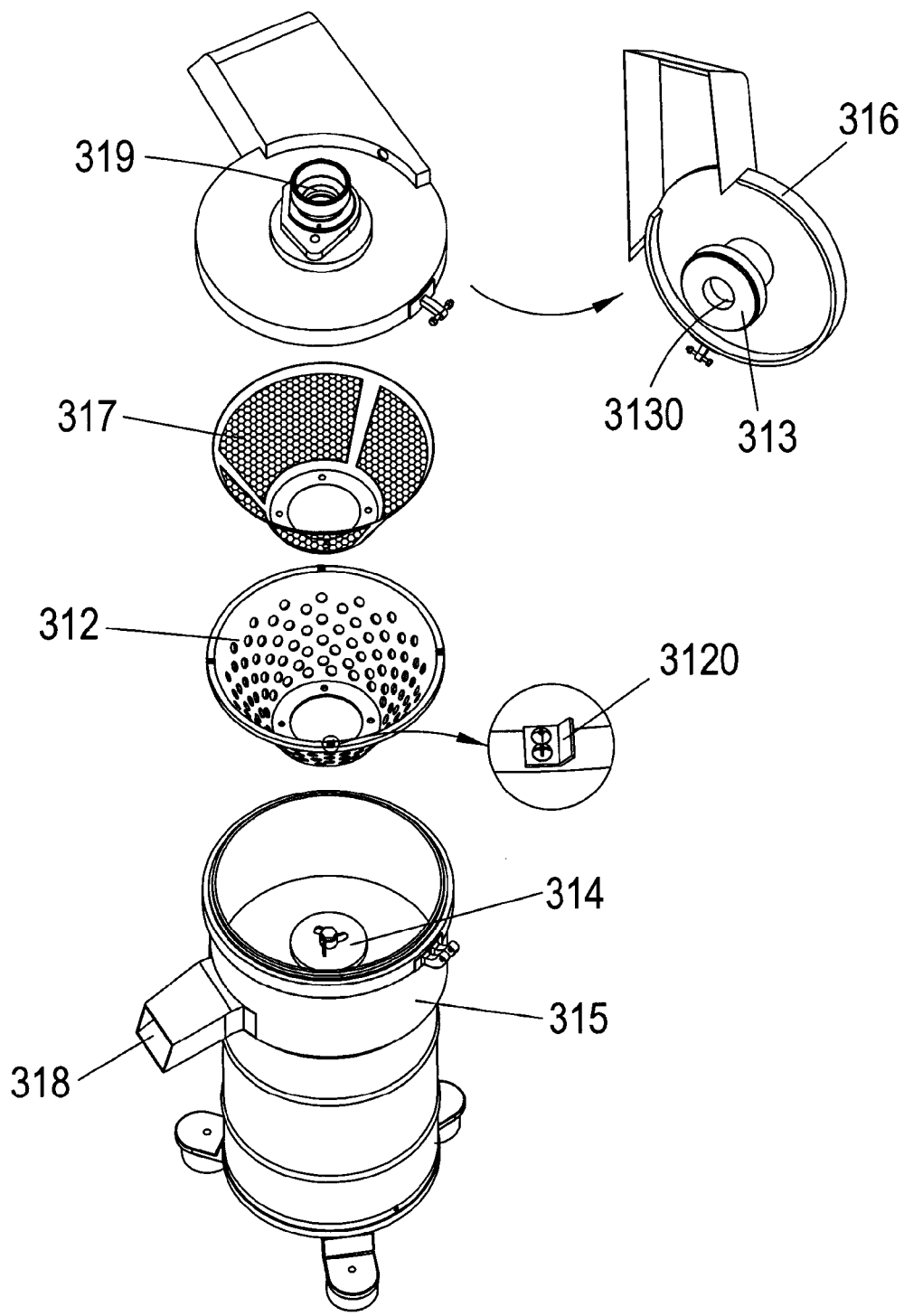
FIG. 4 is an exploded perspective view of the filter of the present invention.
Figure 5:
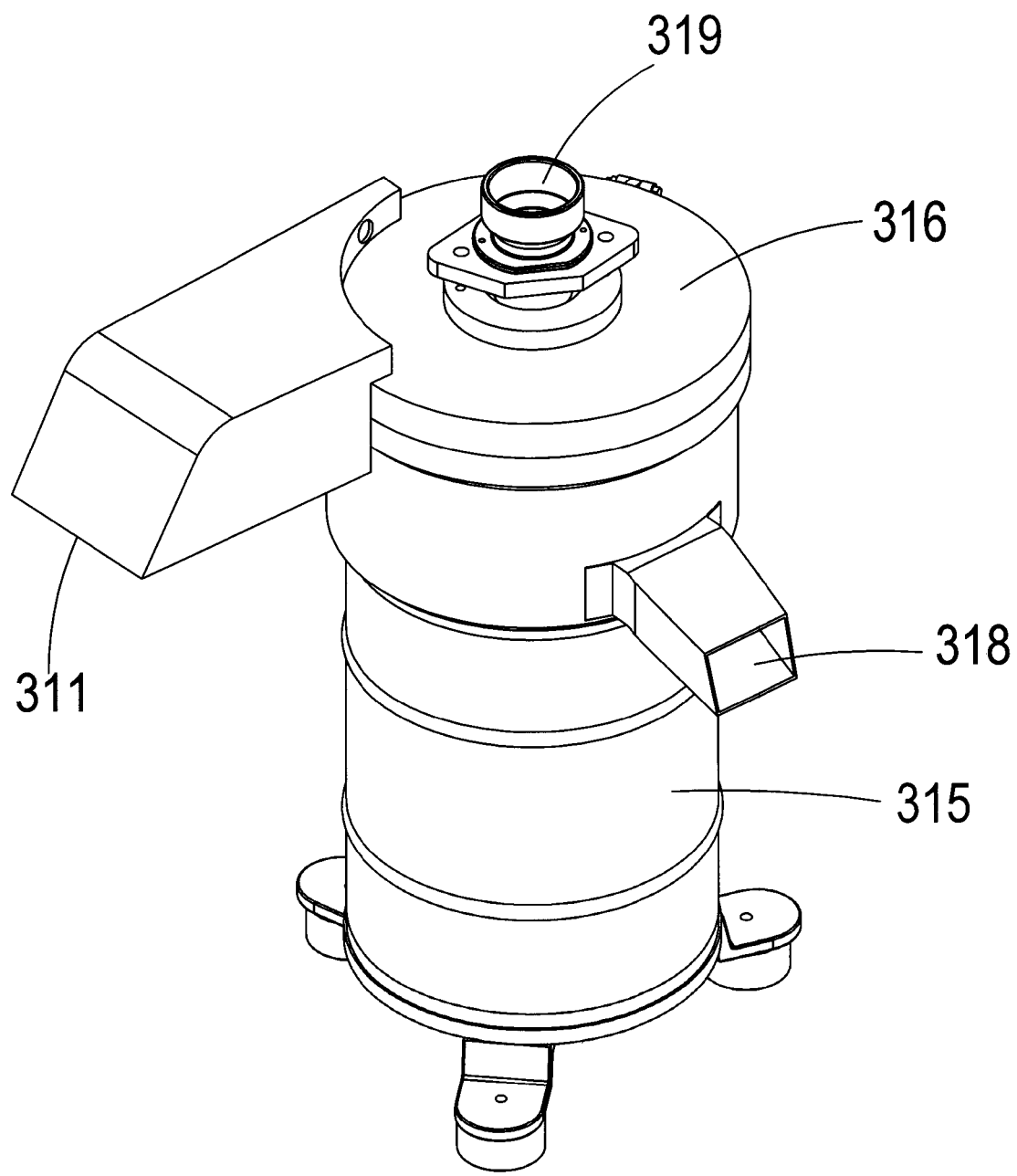
FIG. 5 is an assembled view of the filter of the present invention.

With reference to FIGS. 4 and 5, the complex high-density soybean grinder comprises a suction unit 1, a feeding unit 2, a first filter unit 3, a second filter unit 4, a regeneration barrel set 5 and a reuse barrel set 6. A feeding tube 11 is installed in front of the suction unit 1. A blower 8 and a sound canceller 9 are installed aside the suction unit 1. The feeding tube 11 serves to feed soybeans. The feeding unit 2 is installed below the suction unit 1. The soybean feeding of the feeding unit 2 is controlled by an electric controller box 10. The first filter unit 3 is installed below the feeding unit 2. The regeneration barrel set 5 is connected to the first filter unit 3 and the second filter unit 4 for mixing the soybean dregs from the first filter unit 3 with water and transferred the mixed soybean dregs and water then enter into the second filter unit 4. The reuse barrel set 6 is connected to the first filter unit 3 for guiding the filtered mixed liquid from the second filter unit 4 to the regeneration barrel set 5 and then being pumped to the first filter unit 3 by the water pump 7.

The structure of the first filter unit 3 is approximately identical that of second filter unit 4, which have barrel shapes. The first filter unit 3 includes a seat 315, a cover 316, an upper filter net 317, a lower filter net 312, a top wearing wheel 313 and a lower grinding wheel 314. The seat 315 is installed with a motor (not shown) and has a draining outlet 318. The cover 316 is installed upon the seat 315 for covering thereon. An upper side of the cover 316 has a feeding inlet 319 for feeding soybeans into the seat 315. A dreg outlet 311 is installed to the cover 316 for draining soybean dregs. The upper filter net 317 and the lower filter net 312 are hollow tapered shape bodies. The upper filter net 317 overlaps upon the lower filter net 312. The filtered liquid drains out from the upper filter net 317. The soybeans are driven to the dreg outlet 311 by the extruding sheet 3120 at the top end of the lower filter net 312 by using eccentric force. The upper grinding wheel 313 and the lower grinding wheel 314 serve to grind soybeans. The upper grinding wheel 313 is installed to the feeding inlet 319. The spindle of the upper grinding wheel 313 has an axial hole 3130. The lower grinding wheel 314 is located to a spindle of a motor (not shown) so as to have the function of grinding soybean and removing dregs.

Figure 1:
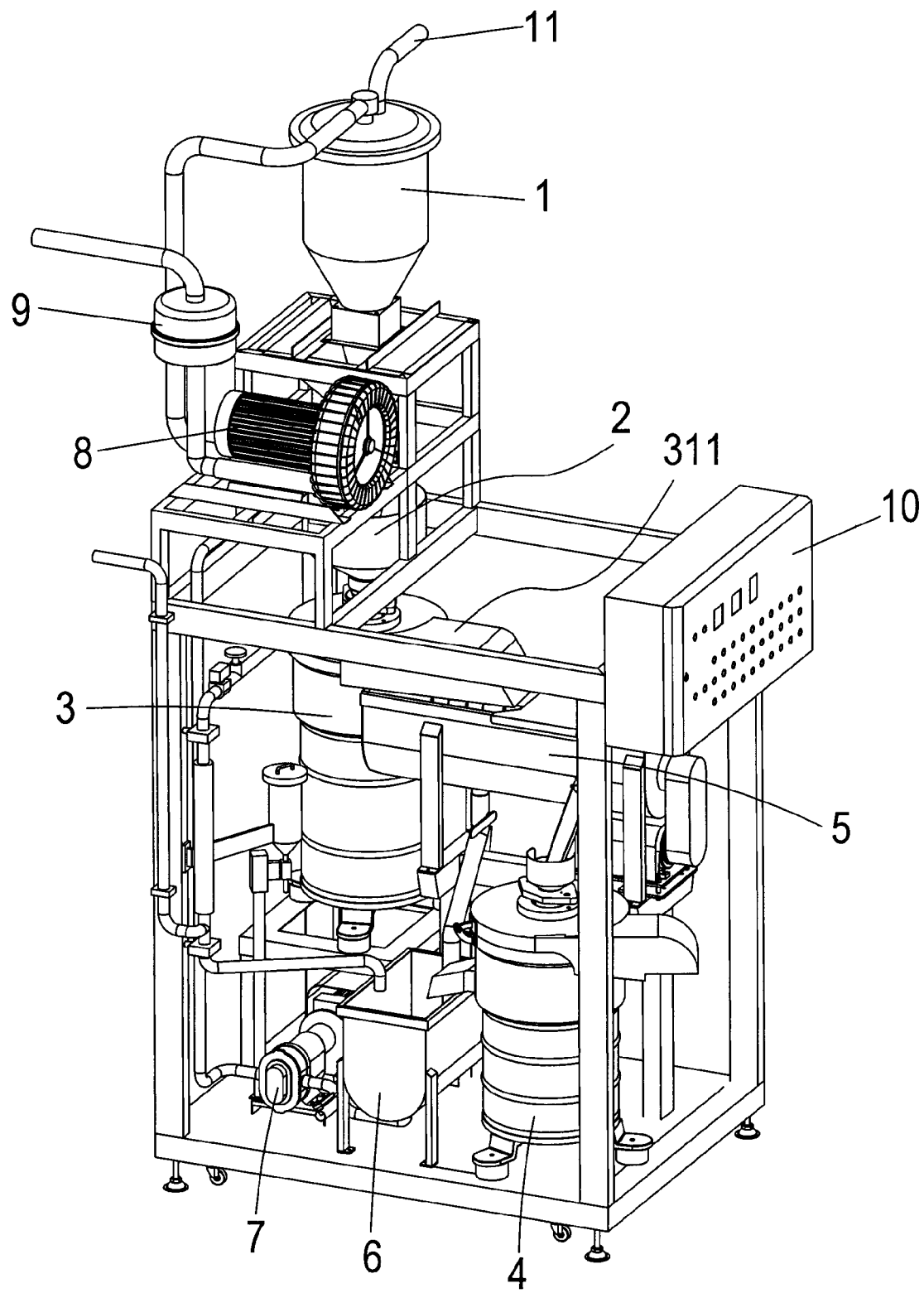
FIG. 1 is a perspective view of the complex high-density soybean grinder of the present invention.
Figure 2:
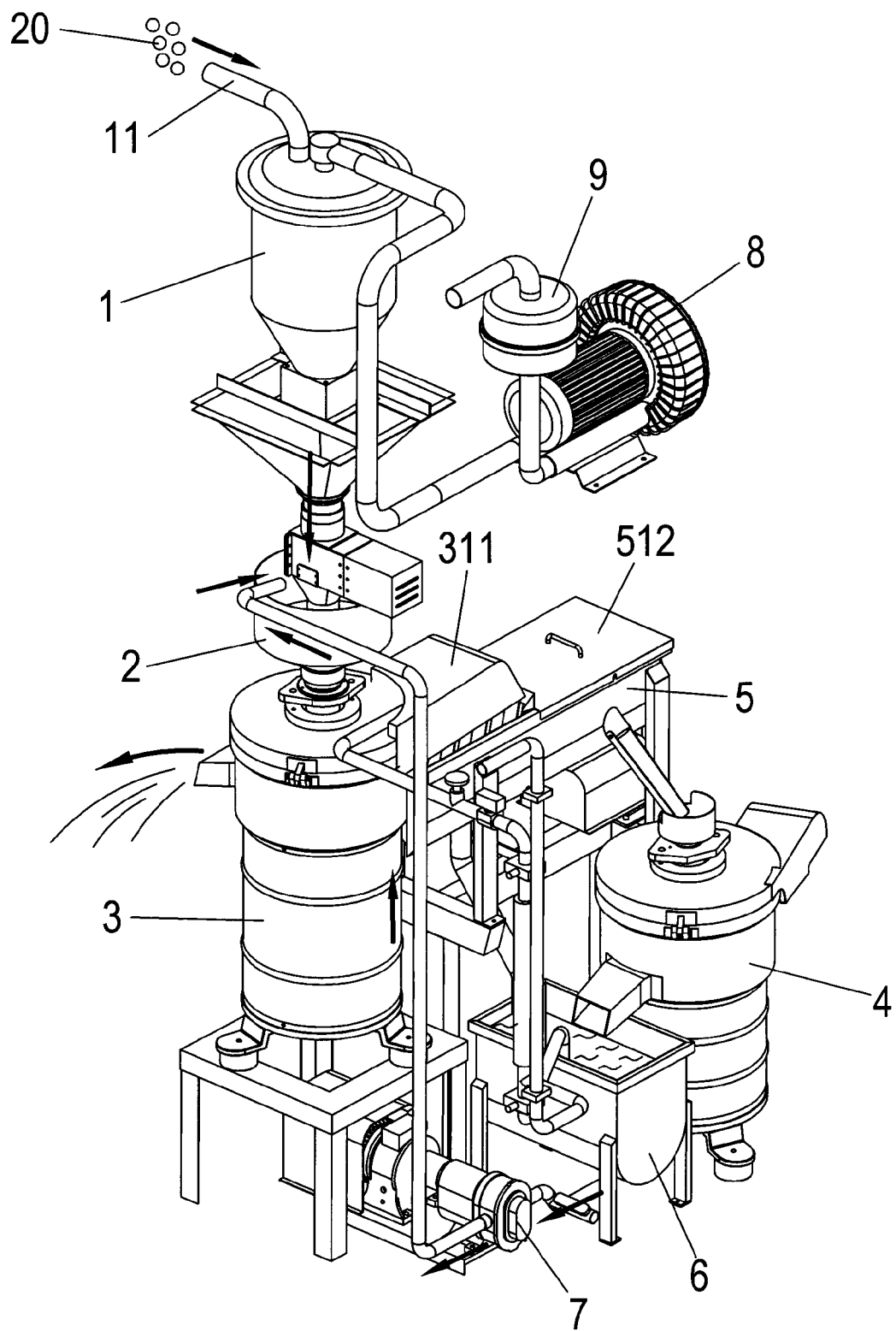
FIG. 2 shows the operation of the complex high-density soybean grinder of the present invention.
Figure 3:
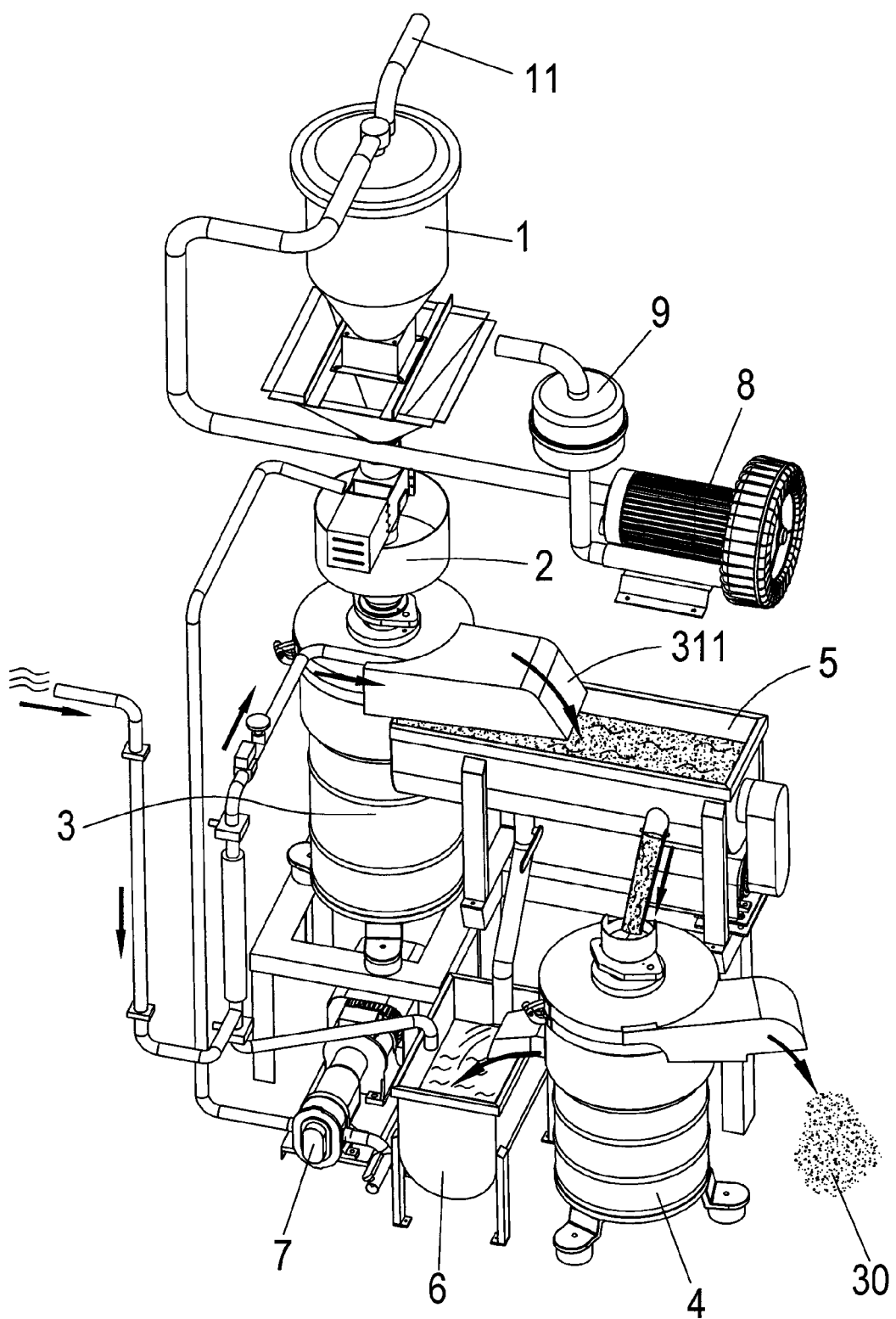
FIG. 3 shows another operation of the complex high-density soybean grinder of the present invention.
Figure 8:
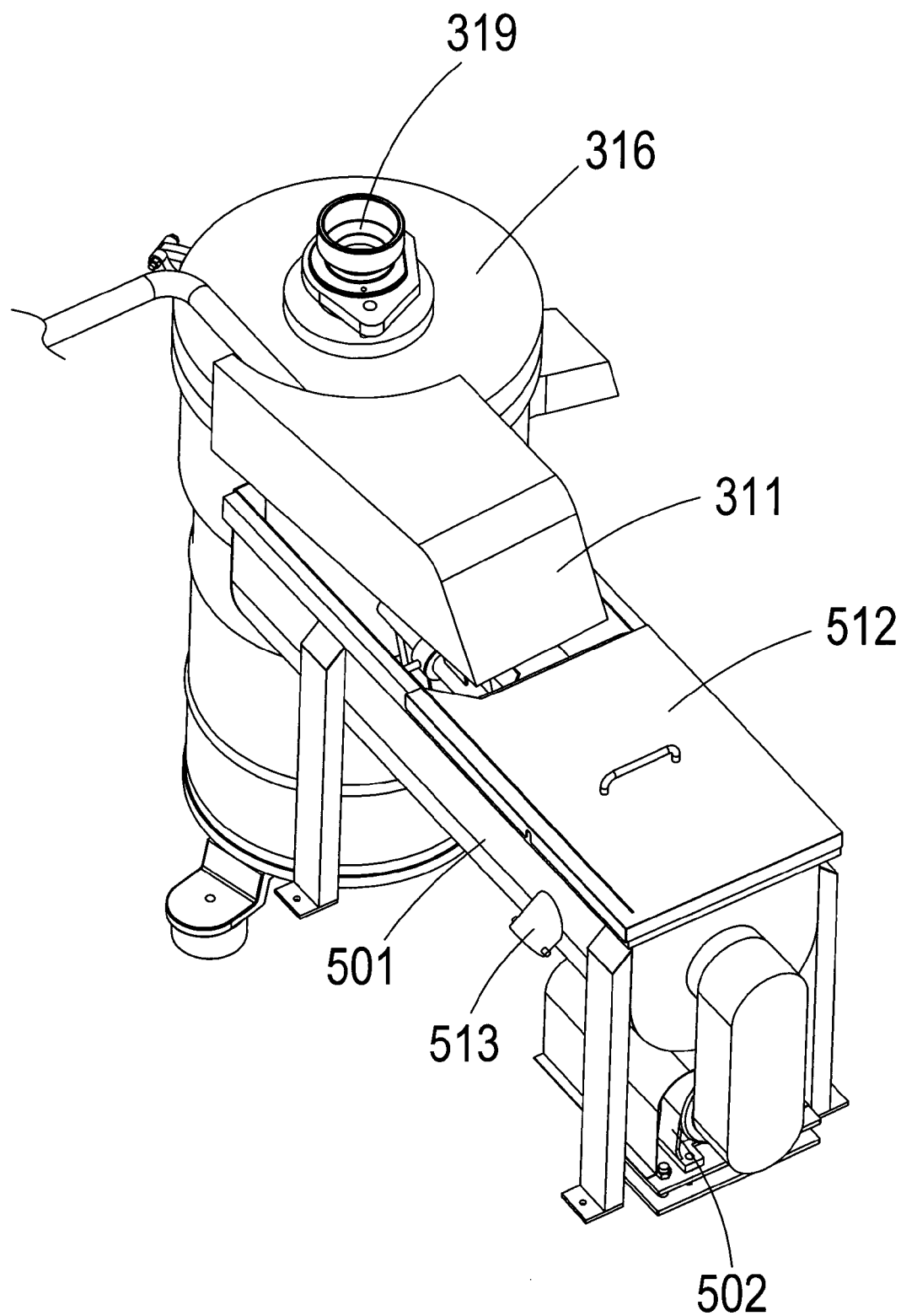
FIG. 8 is an assembled perspective view of the filter and reuse barrel of the present invention.

With reference to FIGS. 2, 3 and 8, the operation of the present invention will be described herein. At first, water is filled into the regeneration barrel set 5 and reuse barrel set 6 and then water is guided to the first filter unit 3 through the pump 7 and the reuse barrel set 6 to mix with the soybeans 20 in the feeding unit 2 and then they are filtered. The filtered liquid is drained out so that filtered soybean dregs are removed to the dreg outlet 311 and then enter into the regeneration barrel set 5 to agitate with water and then they are mixed. Then the fluid containing mixed soybeans and water flows to the second filter 4 for being filtered again. The soybean dregs 30 are drained out so that light filtered liquid flows through the reuse barrel set 6 and then is pumped through the pump 7 to the first filter unit 3 to mix with the soybeans. The process is repeated automatically so that the soybeans can be reused. Furthermore, high-density filtered liquid can be ground.

Figure 6:
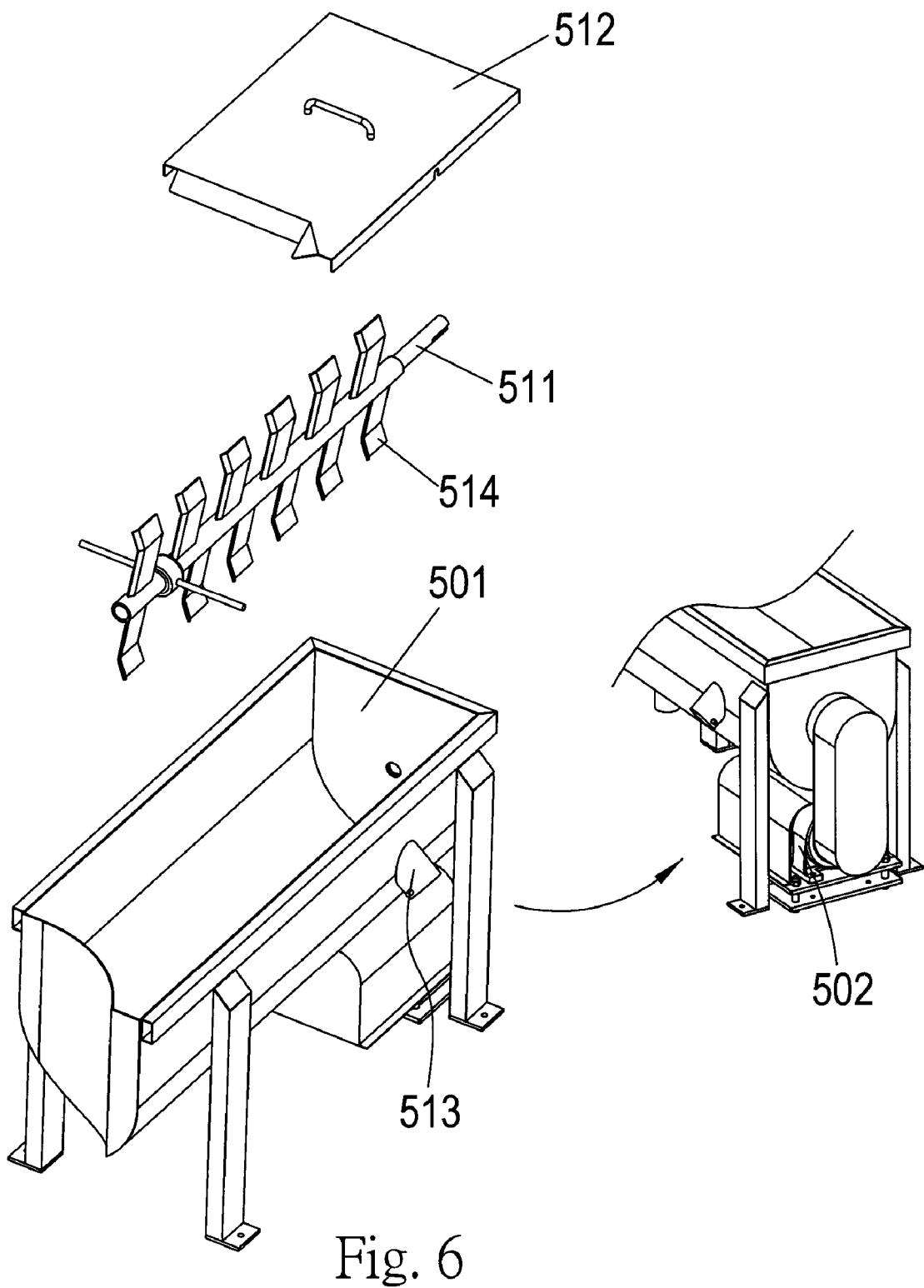
FIG. 6 is an exploded perspective view of the reuse barrel of the present invention.
Figure 7:
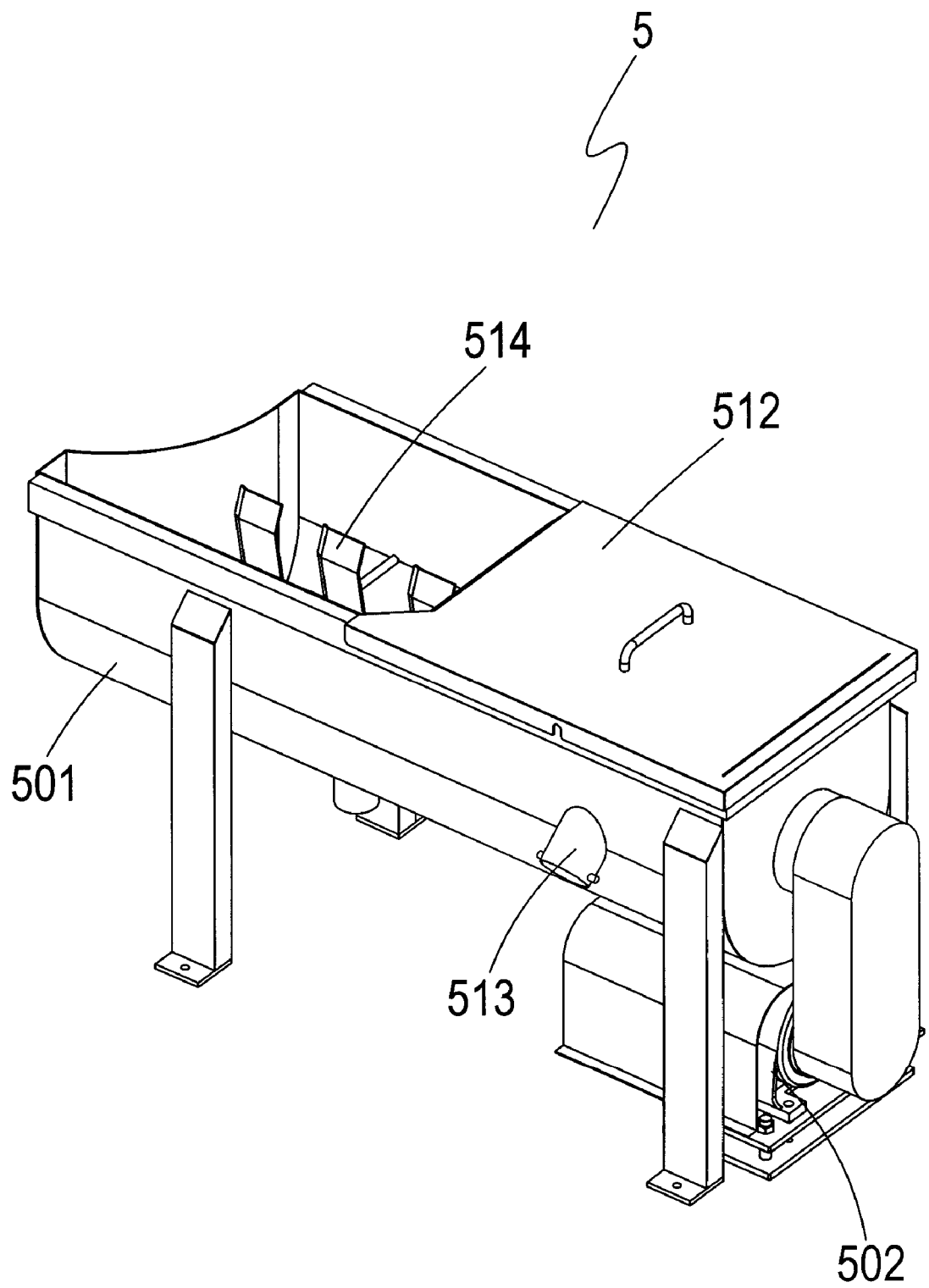
FIG. 7 is an assembled view about the reuse barrel of the present invention.

With reference to FIGS. 6 and 7, it is illustrated that the regeneration barrel set 5 has an agitator 511 and a water outlet 513. The agitator 511 has a plurality of fins 514 which are placed within the reuse barrel 501 and are driven by a motor 502. A shield 512 serves to shield the reuse barrel 501 partially with a notch being formed.

Advantages of the present invention are that:

The complex high-density soybean grinder of the present invention provides the function of auto-adding water to soybean dregs for reuse so as to save the soybean material.

By the complex high-density soybean grinder of the present invention, the soybean can be reused so that the filtered liquid can be reused to become high-density liquid.

The complex high-density soybean grinder of the present invention has a simple structure with a fast operation speed, high yield ratio, high-density and soybean dregs can be removed automatically with a lower cost.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A complex high-density soybean grinder comprising:
   a first filter unit and a second filter unit;
   a suction unit having a feeding tube for supplying soybeans; a lateral side of the suction unit being installed with a blower and a sound canceller so that soybean can enter into the suction unit;
   a feeding unit connected to the suction unit and the first filter unit; an electric controller serving to control the feeding unit;
   a regeneration barrel set connected to the first filter unit and the second filter unit for mixing and agitating soybean dregs from the first filter unit with water; and then the mixed dregs and water being fed into the second filter unit; and
   a reuse barrel set connected to the first filter unit for feeding liquid from the second filter unit to the regeneration barrel set and then to the first filter unit through a pump.

2. The complex high-density soybean grinder as claimed in claim 1, wherein the regeneration barrel set is installed with an agitator.

3. The complex high-density soybean grinder as claimed in claim 2, wherein the agitator has a plurality of fins.

4. The complex high-density soybean grinder as claimed in claim 1, wherein the regeneration barrel set has a water outlet.

5. The complex high-density soybean grinder as claimed in claim 1, wherein the regeneration barrel set has a shield.

6. The complex high-density soybean grinder as claimed in claim 1, wherein each of the first filter unit and the second filter unit comprises:
   a seat having a motor therein and a draining outlet;
   a cover installed on the seat and having a feeding inlet and a dreg outlet;
   an upper filter net for draining filtered liquid;
   a lower filter net; the upper filter net overlapping upon the lower filter net; soybean dregs being driven to the dreg outlet by an extruding sheet at a top end of the lower filter net by using eccentric force;
   an upper grinding wheel installed to the feeding inlet; a spindle of the upper grinding wheel having an axial hole; the upper grinding wheel being installed to a bottom of the feeding inlet and locked to the cover; and
   a lower grinding wheel located to a spindle of a motor and having functions of grinding soybean and removing dregs.

7. The complex high-density soybean grinder as claimed in claim 6, wherein the upper filter net is a hollow tapered body.

8. The complex high-density soybean grinder as claimed in claim 6, wherein the lower filter net is a hollow tapered body.

9. The complex high-density soybean grinder as claimed in claim 1, wherein each filter unit has a barrel shape.

* * * * *